Jan. 10, 1967  I. EDELMAN  3,296,907
TAPE CUTTING APPARATUS
Filed March 10, 1965  3 Sheets-Sheet 1
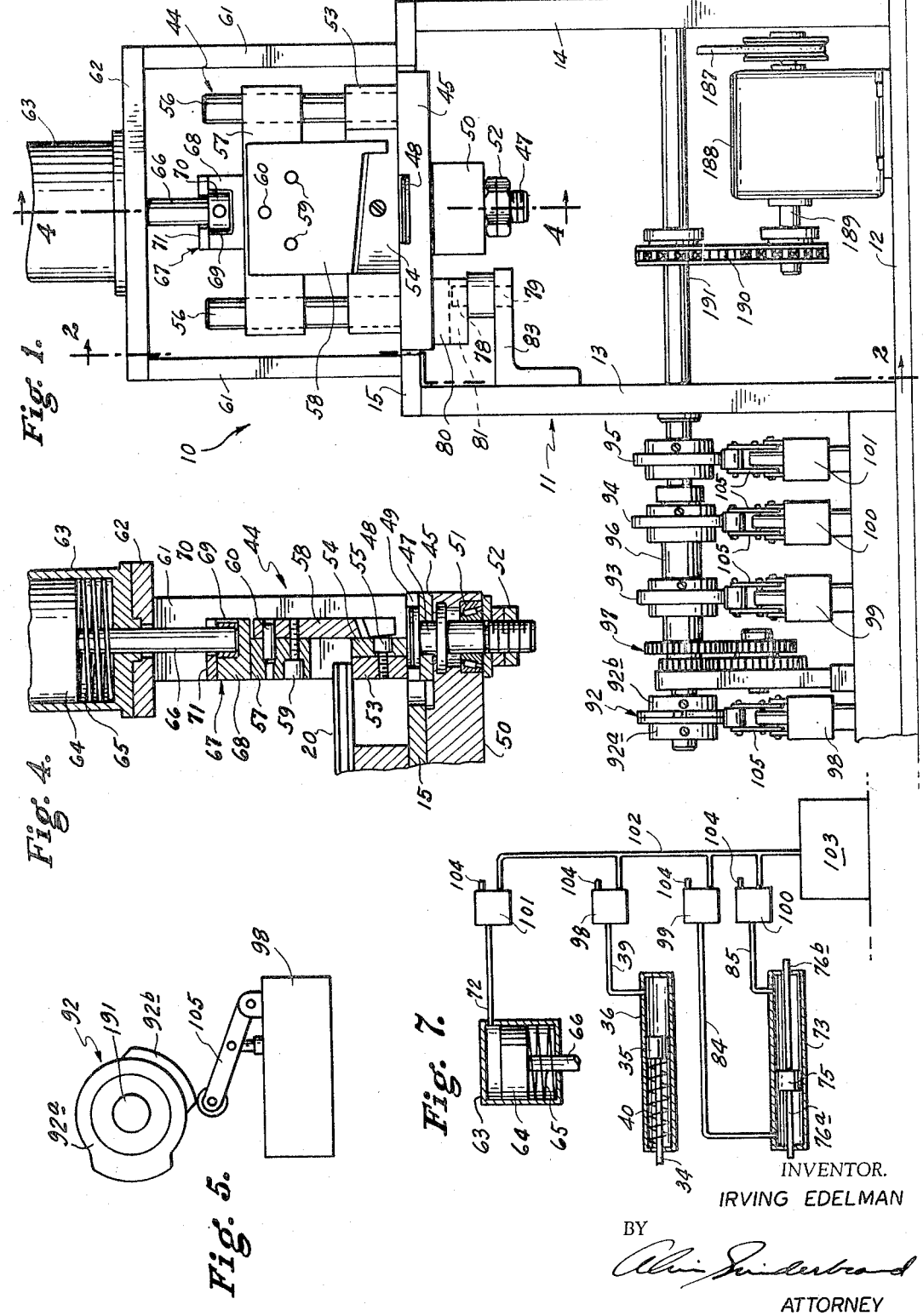
INVENTOR.
IRVING EDELMAN
BY
ATTORNEY

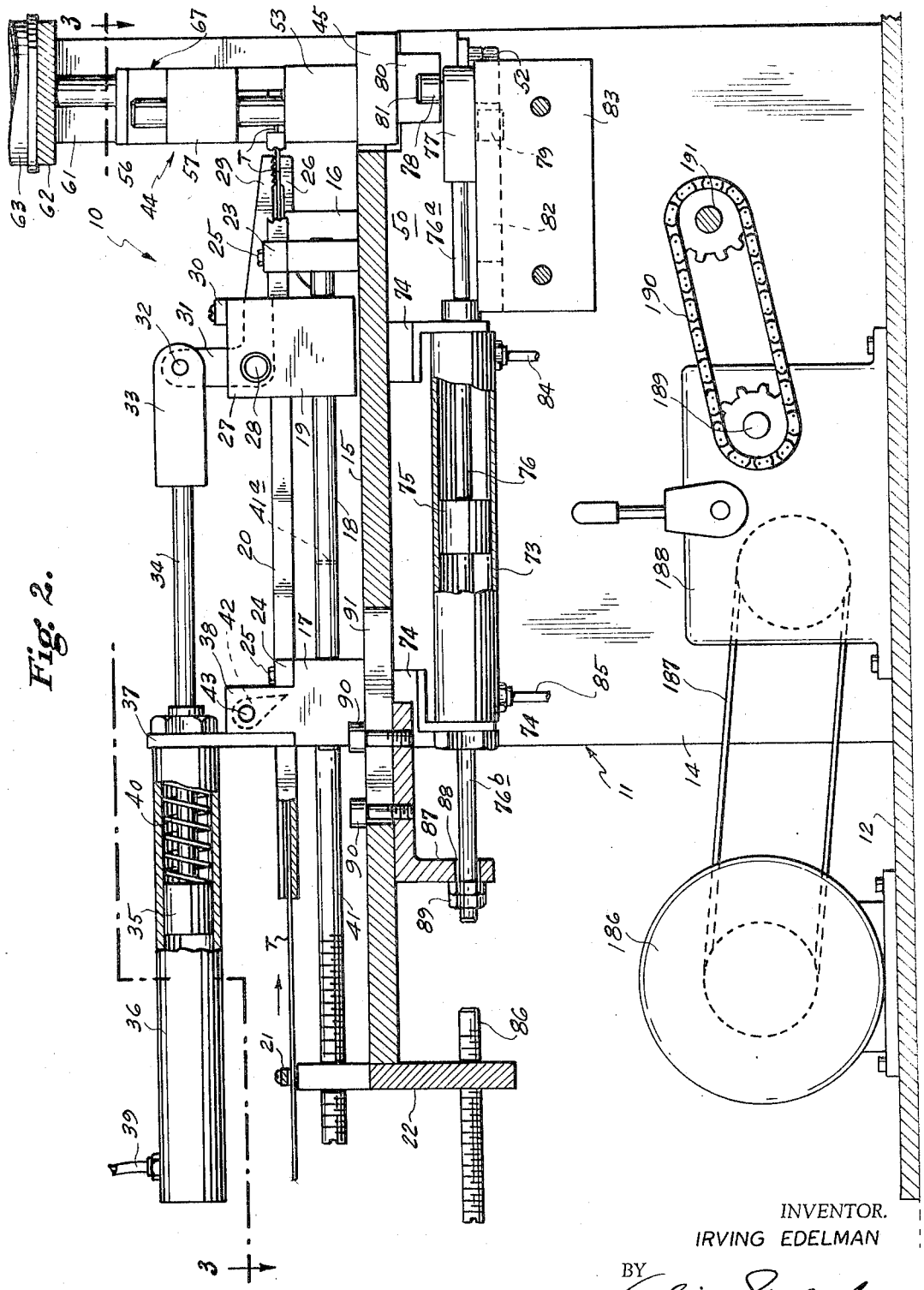

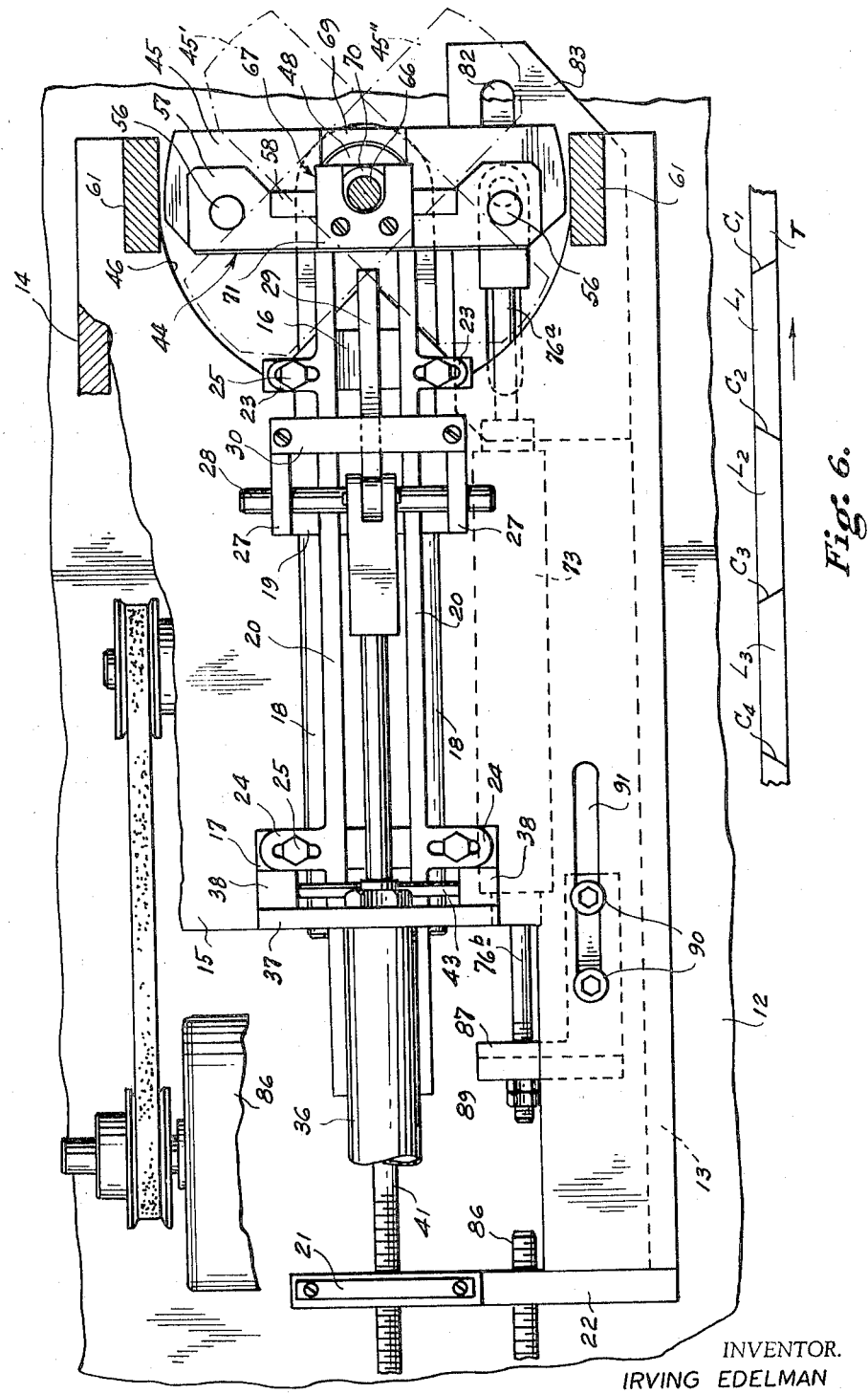

United States Patent Office 3,296,907
Patented Jan. 10, 1967

3,296,907
TAPE CUTTING APPARATUS
Irving Edelman, Franklin Square, N.Y., assignor to Maid-Rite Novelty Corp., Long Island City, N.Y., a corporation of New York
Filed Mar. 10, 1965, Ser. No. 438,641
7 Claims. (Cl. 83—215)

This invention relates to an improved tape cutting apparatus in which a continuous tape is intermittently advanced or fed through predetermined distances to a cutting assembly operative, during intervals between successive advances of the tape, to cut the latter at a distance from the leading end of the tape determined by the previous advance of the tape.

In my copending application for U.S. Letters Patent Serial No. 397,231, filed September 17, 1964, there is disclosed a tape cutting apparatus having an improved tape feeding means which is fluid pressure operated so as to intermittently advance the tape through accurately predetermined distances that can be adjusted during operation of the apparatus, and wherein the cutting assembly is also fluid pressure operated so as to minimize the numbers of relatively moving mechanical parts and thereby permit high speed operation of the tape cutting apparatus without encountering excessive wear and maintenance problems. However, in that previously disclosed tape cutting apparatus, the cutting assembly includes a stationary anvil or blade and a vertically reciprocable blade having cooperating cutting edges that lie in a fixed plane extending at right angles to the longitudinal edges of the tape fed to the cutting assembly so that the lengths of tape cut from the continuous supply thereof always have their opposite or cut ends extending at right angles to the longitudinal edges. However, it is frequently necessary for the opposite ends of each cut length of tape to be disposed at different angles with respect to the longitudinal edges thereof. Although tape cutting apparatus exists for cutting lengths of tape having their opposite ends disposed at different angles with respect to the longitudinal edges, such existing apparatus employs complex mechanical arrangements for effecting feeding of the tape, operation of the cutting assembly and angular displacement of the cutting assembly prior to each operation thereof, so that high operating speeds cannot be attained and excessive wear and maintenance problems are encountered.

Accordingly, it is an object of this invention to provide a tape cutting apparatus capable of operating at high speeds to provide cut lengths of tape with their opposite ends at any desired angles relative to the longitudinal edges, and wherein the apparatus is constructed and designed to be free of excessive wear and maintenance problems.

Another object is to provide a tape cutting apparatus in which the tape feeding means and cutting assembly are driven by fluid pressure operated means, and fluid pressure operated means are also provided for effecting the angular displacements of the cutting assembly prior to each operation thereof, and wherein the several fluid pressure operated means are all controlled from a common cam shaft so as to facilitate synchronization of the operations thereof.

A further object is to provide a tape cutting apparatus in which the angular disposition of the cutting assembly for the successive cutting operations thereof may be easily adjusted, even during operation of the apparatus.

Still another object is to provide a tape cutting apparatus with a fluid pressure operated feeding means which permits a very wide range of adjustment of the lengths of tape to be cut from the continuous supply thereof.

In accordance with an aspect of this invention, a tape cutting apparatus comprises guide means for directing the tape along a path which is rectilinear at least in a terminal portion thereof, feeding means to intermittently advance the tape from the continuous supply thereof along the guide means in the direction toward the terminal portion of the latter, a cutting assembly operative when the tape is at rest to cut across the tape projecting from the terminal portion of the guide means and being mounted for angular displacement relative to the terminal portion of the guide means so as to vary the angle, relative to the longitudinal edges of the tape, at which the tape is cut, a fluid pressure operated cylinder having a piston reciprocable therein which is connected with the mounting of the cutting assembly so as to angularly displace the latter upon movement of the piston in the cylinder, adjustable stop means limiting the angular displacement, in opposite directions, of the cutting assembly by movement of the piston in the cylinder, and control means regulating the supplying of fluid under pressure to the cylinder and being synchronized with the operation of the cutting assembly to reverse the direction in which the piston is urged to move in the cylinder after each operation of the cutting assembly.

In a preferred embodiment of the invention, in which the feeding means and the cutting assembly are also driven by respective fluid pressure operated cylinders, the supplying of fluid under pressure to the several cylinders is controlled by respective valves actuated by corresponding cams on a common cam shaft rotated through a complete revolution during each operating cycle of the apparatus, and the cam actuating the valve which controls the supplying of fluid to the cylinder for effecting angular displacements of the cutting assembly is driven at one half the rotational speed of the other cams.

In accordance with another feature of this invention, the cam actuating the valve which controls the supplying of fluid under pressure to the cylinder for driving the feeding means is formed in two parts which are circumferentially adjustable to permit selection of one or more advancements of the tape for each operation of the cutting assembly, thereby to extend the range of adjustment of the lengths of tape to be cut from the continuous supply.

The above, and other objects, features and advantages of this invention, will be apparent in the following detailed description of an illustrative embodiment thereof which is to be read in connection with the accompanying drawings, wherein:

FIG. 1 is a front elevational view of a tape cutting apparatus embodying this invention;

FIG. 2 is a sectional view taken along the line 2—2 on FIG. 1;

FIG. 3 is a top plan view which is partly in section along the line 3—3 on FIG. 2;

FIG. 4 is a fragmentary sectional view taken along the line 4—4 on FIG. 1;

FIG. 5 is a fragmentary elevational view showing the control cam for the fluid pressure operated feeding means of the tape cutting apparatus;

FIG. 6 is a schematic plan view of a tape showing the oppositely angled lines along which the tape may be successively cut by the apparatus embodying this invention; and FIG. 7 is a diagrammatic view of a system for supplying fluid under pressure to the several operating cylinders of the apparatus.

Referring to the drawings in detail, and initially to FIGS. 1 and 2 thereof, it will be seen that a tape cutting apparatus embodying this invention and generally identified by the reference numeral 10 includes a frame 11 having a base plate 12 from which parallel, laterally spaced walls 13 and 14 extend upwardly to support an elevated plate 15. Mounting blocks 16 and 17 are secured on the elevated plate 15 at longitudinally spaced locations and have a pair of laterally spaced, parallel elongated rods 18 extending therebetween (FIGS. 2 and 3). A slide 19 has parallel spaced apart bores extending therethrough and receiving bushings (not shown) which are slidable on rods 18 so that slide 19 is mounted on rods 18 for reciprocable movement along the latter between mounting blocks 16 and 17.

A guide for the tape extends horizontally between mounting blocks 16 and 17 at an elevation above slide 19 and includes a pair of channel members 20 (FIGS. 2 and 3) which are spaced apart laterally and open toward each other. The tape T is drawn from a roll or other continuous supply thereof (not shown) at the rear of the apparatus 10 and passes forwardly under a laterally directed guide bar 21 mounted above the top edge of a bracket 22 secured to the back ends of elevated plate 15 and wall 13. From guide bar 21 the tape T passes forwardly between guide channels 20 and has its opposite longitudinal edges slidably received and supported in the guide channels with the bottom and top surfaces of the tape being exposed between guide channels 20.

In order to permit guide channels 20 to accommodate tapes of different widths, each guide channel has lugs 23 and 24 extending laterally outward therefrom and formed with laterally elongated slots receiving bolts 25 which are screwed into suitable tapped holes in blocks 16 and 17, respectively. Thus, by loosening bolts 25, guide channels 20 can be adjusted toward or away from each other for accommodating a tape of either smaller or larger width therebetween.

In order to effect forward movement of the tape along guide channels 20, slide 19 has a lower jaw 26 extending forwardly therefrom, and such jaw is laterally and vertically disposed so as to extend upwardly into the space between guide channels 20 to a level slightly below the plane of the lower surface of the tape supported by the guide channels. The slide 19 further has laterally spaced ears 27 extending upwardly therefrom and disposed laterally outward with respect to the guide channels to support the ends of an axle 28 which extends laterally above the guide channels. An upper jaw 29 is rockably mounted on axle 28 and extends forwardly from the latter so as to overlie the lower jaw 26. The upper jaw 29 is rockable from its operative position shown on FIG. 2, where the upper jaw extends downwardly into the space between guide channels 20 so as to grip the tape from above against the lower jaw 26, to a raised or inoperative position where the upper jaw 29 is withdrawn from between guide channels 20 and thereby releases the tape between the two jaws. A stop limiting the upward rocking movement of jaw 29 to its inoperative position is defined by a bar or abutment 30 which is mounted on and extends between the ears 27 so as to be engageable by the upper edge surface of jaw 29.

Formed integrally with upper jaw 29, and extending radially upward from the rocking axis defined by axle 28, is an arm 31 (FIG. 2) which, at its upper end, is connected by a pivot pin 32 to a clevis 33 secured on a piston rod 34. The rod 34 extends parallel to the path of movement of slide 19 on rod 18 and is secured to a piston 35 reciprocable in a cylinder 36. The cylinder 36 is mounted so as to extend rearwardly from a bracket 37 secured to lugs 38 projecting upwardly from mounting block 17 at laterally spaced locations The lower portion of bracket 37 is centrally cut out so that the rear end portions of guide channels 20 can extend therethrough.

The movement of piston 35 within cylinder 36, at least in the forward direction, that is, for effecting the operative stroke of slide 19, is caused by fluid under pressure, for example, compressed air, admitted to the back end of cylinder 36 through a tube or conduit 39. The movement of piston 35 in the opposite direction for effecting the return stroke of slide 19 is effected either by fluid under pressure admitted to cylinder 36 at the forward end of the latter, or by a compression spring 40 disposed within the cylinder and acting against piston 35, as shown on FIG. 2.

The return stroke of slide 19 is limited by a stop screw 41 (FIGS. 2 and 3) extending threadably through a tapped bore in bracket 22 and passing forwardly through a bore in block 17 midway between rods 18 so that the forward end of stop screw 41, which is indicated in broken lines at 41a on FIG. 2, projects into the path of movement of slide 19 toward block 17.

In order to prevent reverse or rearward movement of the tape when the latter is released between jaws 26 and 29, a pull-back dog 42, appearing in broken lines on FIG. 2, is pivotally mounted on a shaft 43 extending laterally between lugs 38 and is engageable with the tape on the upper surface of mounting block 17. As shown, the dog 42 is inclined forwardly, that is, in the direction of the desired feeding movement of the tape, so as to resist or prevent only the reverse movement of the tape.

The tape feeding means of the apparatus 10, as described above, is substantially similar to that disclosed in my copending application Serial No. 397,231, filed September 17, 1964, and operates as follows:

When the tube 39 is vented to the atmosphere, that is, when fluid under pressure does not act in cylinder 36 against piston 35, spring 40 drives piston 35 rearwardly or to the left, as viewed on FIG. 2. By reason of the frictional resistance to movement of slide 19 on rods 18, such movement of piston 35 by spring 40 initially causes rocking of the upper jaw 29 to its raised or inoperative position against stop 30, whereupon further rearward movement of piston 35 effects corresponding movement of slide 19 until the latter engages the adjustable stop screw 41. During rearward movement of slide 19, jaws 26 and 29 are free of the tape T so that the latter remains at rest between guide channels 20, and any reverse movement or pull-back of the tape is further resisted by the dog 42.

When fluid under pressure is admitted to cylinder 36 through tube 39 to effect forward movement of piston 35, the initial movement of the piston causes rocking of upper jaw 29 to its operative position, that is, downwardly so as to grip or press the tape T against lower jaw 26. After the tape has been securely gripped between jaws 26 and 29, further forward movement of piston 35 overcomes the frictional resistance to movement of slide 19 and the latter is moved or stroked forwardly until it comes into contact with the forward mounting block 16. During such movement of slide 19, the tape is tightly gripped between jaws 26 and 29 which both move with slide 19 so that the tape is advanced through a distance exactly equal to the distance moved by slide 19 from the point of its contact with stop screw 41 to its point of contact with forward mounting block 16.

When cylinder 36 is again vented to the atmosphere, the initial action of spring 40 on piston 35 causes movement of upper jaw 29 to its raised or inoperative position and thereafter the force of spring 40 effects return movement of slide 19 to its starting position against stop screw 41. It will be apparent that, by adjusting the stop screw 41 and hence varying the starting position of slide 19, the length of the operative stroke of the slide can be adjusted thereby to correspondingly vary the distance through which the tape T is forwardly advanced during each operative stroke of the feeding means.

The tape cutting apparatus 10 further comprises a cutting assembly generally identified by the reference numeral 44 which is mounted, as hereinafter described in detail, in front of the forward mounting block 16 so that, at the end of each operative stroke of the above described tape feeding means, a predetermined length of the tape projects out of the forward ends of guide channels 20 and beyond the cutting assembly 44 so as to be cut, upon operation of the latter, from the remainder of the tape.

In accordance with this invention, the cutting assembly 44 is mounted on an elongated base 45 which extends horizontally in a substantially semi-circular cutout 46 (FIG. 3) formed in the forward end portion of elevated plate 15. The base 45 is mounted for angular displacement about a vertical axis which is located midway between the ends of base 45 and which lies in the vertical plane of symmetry of the tape feeding means. In the embodiment shown, the mounting for the base 45 includes a bolt 47 extending downwardly through a central hole in base 45 and having its head 48 recessed in a shallow groove 49 formed in the top surface of the base (FIGS. 3 and 4). The bolt 47 extends downwardly through a bearing arm 50 which is suitably secured to the underside of plate 15 and projects forwardly into the center of cutout 46. Within the bearing arm 50, the bolt 47 is turnably mounted in bearings 51 (FIG. 4) and nuts 52 are engaged on the lower threaded end of bolt 47 to hold base 45 on arm 50.

The cutting assembly 44 includes an anvil 53 which is suitably secured on the turnable base 45 and which has a blade 54 secured in front of the central portion of the anvil, as by a screw 55 (FIGS. 1 and 4). As shown particularly on FIG. 4, the top surfaces of anvil 53 and blade 54 fixed thereto are disposed immediately below the level of guide channels 20 and the forward ends of the guide channels extend above anvil 53 so as to guide the tape close to the cutting edge of blade 54 which is defined at the intersection of the top and forward surfaces thereof. The blade 54 is dimensioned and located on base 45 so that the axis about which the latter is angularly displaceable lies in the plane of the front surface of blade 54.

Extending upwardly from the opposite end portions of anvil 53 are two posts 56 (FIGS. 1, 2 and 3) on which a head 57 is vertically movable. A vertically reciprocable shearing blade 58 is secured, as by screws 59 and a locating pin 60, to the front of head 57 and depends from the latter so as to pass downwardly in front of fixed blade 54 and cooperate therewith in shearing or cutting the tape extending beyond the cutting assembly.

Side frame members 61 extend upwardly from plate 15 at the opposite sides of cutout 46 and, at their upper ends, support a cross frame member 62. A vertical cylinder 63 is mounted on cross frame member 62 so that its axis is in alignment with the axis about which base 45 is turnable. Cylinder 63 contains a reciprocable piston 64 (FIG. 4) urged upwardly within the cylinder by a spring 65. A piston rod 66 extends downwardly from piston 64 out of cylinder 63 and through a central opening in cross frame member 62. The lower end of piston rod 66 is connected by a coupling 67 with the head 57 so that the latter and blade 58 move vertically with piston 64. The coupling 67 preferably permits turning of head 57 relative to piston rod 66 and, as shown, may include a block 68 secured on head 57 and formed with a recess 69 dimensioned to turnably receive a collar 70 that is pinned or otherwise secured on the lower end of piston rod 66. The collar 70 is held against upward axial removal from recess 69 by a retaining plate 71 (FIGS. 1, 3 and 4) secured on top of block 68.

A tube or conduit 72 (FIG. 7) is connected to the upper end of cylinder 63 so that piston 64 is moved downwardly against the force of spring 65 when fluid under pressure, for example, compressed air, is supplied to the cylinder 63 by way of conduit 72, thereby to effect the downward or operative stroke of shearing blade 58, while the spring 65 moves the piston 64 upwardly to effect the return stroke of blade 58 when conduit 72 is vented to the atmosphere.

It is intended that compressed air be supplied to cylinder 36 to effect the feeding of tape along guide channels 20 at a time when cylinder 63 is vented to the atmosphere, that is, when shearing blade 58 is raised so as to avoid interference with the movement of the leading end of the tape out of guide channels 20 and beyond the fixed blade 54. Conversely, compressed air is supplied to cylinder 63 to effect the operative or downward stroke of shearing blade 58 for cutting the tape at a time when cylinder 36 is vented to the atmosphere so as to return slide 19 to its starting position against stop screw 41.

In order to effect angular displacement of base 45, and hence of the cutting assembly 44 mounted thereon, the tape cutting apparatus 10 embodying this invention further comprises a cylinder 73 (FIGS. 2 and 3) suspended by brackets 74 below elevated plate 15 so as to extend horizontally substantially parallel to the direction of the feeding movement of the tape between guide channels 20 and being offset to one side of the tape feeding means. A piston 75 is reciprocable within cylinder 73 (FIG. 2) and is suitably secured to a piston rod 76. The rod 76 extends in opposite axial directions from the piston and has end portions 76a and 76b projecting from the opposite ends of cylinder 73. The forwardly directed end portion 76a of the piston rod carries a head 77 which, in turn, supports an upwardly directed roller 78 and a downwardly directed roller or guide pin 79. A coupling member 80 is secured to the underside of base 45 adjacent one end of the latter and is formed with a downwardly opening groove 81 (FIGS. 1 and 2) which extends radially with respect to the turning axis of base 45 and receives the roller 78. By reason of the engagement of roller 78 in groove 81, base 45 is turned about the axis defined by bolt 47 in response to movement of piston 75 within cylinder 73. In order to avoid the imposition of lateral loads on the end portion 76a of the piston rod, and thereby protect the seals of cylinder 73 from excessive wear particularly during high speed operation, the roller or pin 79 depending from head 77 engages in a rectilinear slot 82 extending parallel to the axis of cylinder 73 and being formed in an angle member 83 secured to the adjacent side wall 13 of frame 11.

Tubes or conduits 84 and 85 are connected to the front and back ends, respectively, of cylinder 73 so that, when fluid under pressure, for example, compressed air, is supplied to the cylinder 73 through conduit 84 and conduit 85 is vented to the atmosphere, the compressed air within cylinder 73 urges piston 75 rearwardly therein and thereby urges base 45 and the cutting assembly 44 to turn in the clockwise direction, as viewed on FIG. 3, for example, to the position indicated in broken lines at 45'. On the other hand, when compressed air is supplied to the cylinder through conduit 85 and conduit 84 is vented to the atmosphere, piston 75 is urged forwardly within cylinder 73 and thereby tends to turn base 45 in the counterclockwise direction, as viewed on FIG. 3, for example, to the position indicated in broken lines at 45".

In order to limit the positions to which base 45 and cutting assembly 44 may be angularly displaced in both directions, tape cutting apparatus 10 further has a stop screw 86 extended threadably through bracket 22 (FIGS. 2 and 3) in axial alignment with piston rod 76 so that the forward end of stop screw 86 is interposed in the path of movement of end portion 76b of the piston rod and thereby adjustably limits the rearward movement of the piston rod. It will be apparent that such limitation of the rearward movement of piston rod 76 determines the position to which base 45 can be angularly displaced in the clockwise direction, as viewed on FIG. 3.

The limit of the forward movement of piston rod 76, and hence of angular displacement of base 45 in the counterclockwise direction, as viewed on FIG. 3, is determined by an angle member 87 suspended below plate 85 and having an opening 88 in its depending flange through which end portion 76b of the piston rod slidably extends. Nuts 89 are threadably engaged on end portion 76b of the piston rod in back of angle member 87 and are engageable with the latter, as shown on FIGS. 2 and 3, so as to limit forward movement of piston rod 76. In order to permit adjustment of the limit of the forward movement of piston rod 76, angle member 87 is suspended from plate 15 by means of screws 90 which extend through a slot 91 formed in plate 15 parallel to the axis of cylinder 73 and which are threadably engaged in tapped holes in angle member 87. Thus, upon loosening of screws 90, angle member 87 can be adjusted forwardly or rearwardly along slot 91 so as to correspondingly adjust the limit of the forward movement of piston rod 76.

In the drawings, the stop screw 86 is shown adjusted to permit the full angular displacement of base 45 in the clockwise direction, as viewed on FIG. 3, to the position indicated at 45′, in which position the line along which the tape is cut is disposed at approximately 45° with respect to the longitudinal edges of the tape. The angle member 87 is shown adjusted to limit the angular displacement of base 45 in the counterclockwise direction to the position shown in full lines on FIG. 3, in which position the tape is cut along a line extending at right angles to the longitudinal edges of the tape. However, it will be apparent that, by forwardly adjusting angle member 87 approximately to the full extent permitted by slot 91, the limit of angular displacement of base 45 in the counterclockwise direction can be adjusted to the position indicated at 45″ on FIG. 3. It will further be apparent that stop screw 86 and angle member 87 can be adjusted to provide limits of the angular displacement of base 45 in opposite directions at any positions between that shown in full lines on FIG. 3 and the extreme positions shown in broken lines at 45′ and 45″, respectively.

It is intended that the supplying of compressed air to cylinder 73 be controlled, in synchronism with the operation of cutting assembly 44 so as to reverse the direction in which piston 75 is urged to move the cylinder 73 after each operation of the cutting assembly. Thus, by suitably adjusting the positions of stop screw 86 and angle member 87, the lines along which the tape T is successively cut, as at $C_1$, $C_2$, $C_3$ and $C_4$ on FIG. 6, may be oppositely angled with respect to the longitudinal edges of the tape to produce successive cut lengths $L_1$, $L_2$ and $L_3$ having end edges that are oppositely angled relative to the longitudinal edges thereof. In order to cut the tape as diagrammatically shown on FIG. 6, the angle member 87 would have to be adjusted forwardly from the position shown on FIGS. 2 and 3 for permitting the necessary angular disposition of the cutting plane during the cutting of the tape at $C_1$ and $C_3$.

For controlling the operations of the several cylinders 36, 63 and 73 in actuating the tape feeding means and cutting assembly, and in angularly displacing the cutting assembly, respectively, the apparatus 10 has an electric motor 186 mounted on base 12 and connected through a belt and pulley transmission 187 (FIGS. 2 and 3) with the input shaft of a commercially available variable speed change 188 (FIGS. 1 and 2). The output shaft 189 of variable speed changer 188 is connected through a chain and sprocket transmission 190 with a laterally directed cam shaft 191 journaled in suitable bearings carried by side walls 13 and 14. The cam shaft 191 projects laterally outward beyond side wall 13 and carries a series of radial cams 92, 93, 94 and 95 (FIG. 1). The cams 92 and 95 respectively control the operations of the cylinders 36 and 63, and are secured on cam shaft 191 to rotate at the same rotational speed as the cam shaft. The cams 93 and 94 both control the operation of cylinder 73 and are secured on a sleeve 96 which is mounted on cam shaft 191 and turnable relative to the latter. The sleeve 96, and hence the cams 93 and 94 thereon, are made to turn at one-half the rotational speed of cam shaft 191 by means of a suitable gear train 97 operatively interposed between the cam shaft and the sleeve. The cams 92, 93, 94 and 95 respectively actuate valves 98, 99, 100 and 101 which are mounted below the cam shaft, as shown on FIG. 1, and which are preferably of the so-called "quick dump" type, for example, valves commercially available under the designation 125C–3–10–21–41–51, from Humphrey Products Company, of Kalamazoo, Michigan.

Referring particularly to FIG. 7, it will be seen that the valves 98, 99, 100 and 101 are respectively interposed between conduits 39, 84, 85 and 72, on one side, and a manifold 102 carrying compressed air from a source thereof indicated schematically at 103. Each valve further has a vent or opening to the atmosphere indicated at 104 and a cam follower 105 (FIG. 2) engaging the periphery of the respective cam. Each of the valves connects the related conduit 39, 84, 85 or 72 with the compressed air supply manifold 102 when the cam follower 105 of the valve engages a radially enlarged portion of the respective cam. However, when the cam follower rides against a radially small portion of the respective cam, the related valve is effective to vent the conduit 39, 72, 84 or 85 to the atmosphere through the valve's vent or port 104.

In a typical operative arrangement embodying this invention, the cam 95 which controls the operation of cylinder 63 has a radially enlarged portion extending over approximately 25° of its circumference to cause the downward cutting stroke of blade 58 during engagement of the follower 105 of valve 101 with such radially enlarged portion, and to permit the return of blade 58 to its raised position by the operation of spring 65 during the remaining 335° of each revolution of the cam shaft.

As shown on FIG. 5, the cam 92 for controlling the operation of cylinder 36 is preferably formed of two portions 92a and 92b individually secured to cam shaft 191, and each having a radially raised portion for engagement by the follower 105 of valve 98. The cam portions 92a and 92b may be positioned on shaft 191 so that their radially raised portions are angularly or circumferentially spaced, as shown, so as to be successively engaged by cam follower 105 of valve 98 during the interval, in each revolution of cam shaft 191, when cam 95 causes valve 101 to hold shearing blade 58 at its raised position. Thus, with the cam portions 92a and 92b arranged as shown on FIG. 5, piston 36 will cause two advancements of the tape through the distance determined by the setting of stop screw 41 in the interval between successive operations of cutting assembly 44. On the other hand, when cam portions 92a and 92b are angularly adjusted on cam shaft 191 so that their radially enlarged portions will coincide circumferentially, then cylinder 36 will cause only a single advancement of the tape during each interval between successive operations of the cutting assembly. It will be apparent from the foregoing that the provision of the cam 92 in two portions, as described, affords an increased range of adjustment of the length of the tape projecting beyond the fixed blade 54 at the time of each operation of the cutting assembly, and hence of the cut lengths of tape.

The cams 93 and 94 rotating at one-half the speed of cam shaft 191 have their radially enlarged portions angularly spaced relative to each other so as to be substantially diametrically opposed, and also angularly disposed relative to sleeve 96 so as to be successively engaged by followers 105 of valves 99 and 100 during the intervals in successive revolutions of cam shaft 191 immediately prior to, and during the engagement of the radially enlarged portion of cam 95 with the follower of valve 101 to cause the operative stroke of blade 58.

When the radially enlarged portion of cam 93 is engaged by the follower 105 of valve 99, compressed air is supplied through conduit 84 to the forward end of cylinder 93 to cause rearward movement of piston 75 and consequent turning of base 45 and cutting assembly 44 in the clockwise direction, as viewed on FIG. 3, to the extent permitted by the engagement of end portion 76b of the piston rod with stop screw 86, for example, to the position required for forming the cut $C_2$ on FIG. 6. Cam 93 and valve 99 cause cylinder 73 to hold the cutting assembly in the position determined by engagement of the piston rod with stop screw 86 until the completion of the operative stroke of shearing blade 58 and the commencement of the upward or return movement of the shearing blade. Thereafter, the follower of valve 99 rides off the radially enlarged portion of cam 93 and the radially enlarged portion of cam 94 comes into engagement with the follower of valve 100 so that the latter is then effective to supply compressed air to cylinder 73 through the conduit 85. When compressed air is supplied to the cylinder through conduit 85, piston 75 is displaced forwardly to turn base 45 and cutting assembly 44 in the counterclockwise direction as viewed on FIG. 3, for example, to the position necessary for forming the next angled cut $C_3$. The radially enlarged portion of cam 94 continues to engage the follower of valve 100 for holding the cutting assembly in the position corresponding to engagement of the nuts 89 on the piston rod with member 87 until the shearing blade 58 has completed its operative stroke for forming the cut $C_3$. Upon the return or upward movement of the shearing blade, the radially raised portion of cam 93 again causes actuation of valve 99 to effect swinging or angular displacement of the cutting assembly to the position required for the next cut $C_4$.

Although FIG. 6 of the drawing shows the successive cuts being oppositely angled, it will be apparent that the described apparatus permits wide variations in the angular dispositions of the opposite ends of the successive lengths of tape cut from the continuous supply. Thus, if the member 87 is adjusted as shown on FIGS. 2 and 3 so as to be engaged by the nuts 89 on the piston rod when base 45 extends at right angles to the longitudinal edges of the tape, then each of the cuts appearing at the locations of the cuts $C_1$ and $C_3$ on FIG. 6 will be directed at right angles to the longitudinal edges of the tape and each cut length of tape will have one oblique end and one right-angled end. It will also be seen that, if member 87 is retained in the position shown on FIGS. 2 and 3, and if stop screw 86 is adjusted forwardly to engage the end portion 76b of the piston rod simultaneously with the contact of nuts 89 with member 87, then any movement of piston 75 within cylinder 73 is prevented and the base 45 and cutting assembly 44 are fixed at the position shown in full lines on FIG. 3, or at any other position for which stop screw 86 and member 87 are jointly adjusted.

It will be apparent that the described tape cutting apparatus further has considerable flexibility with respect to the lengths of the tape to be cut, both by adjustment of stop screw 41 controlling the length of the feeding stroke, and by relative adjustment of cam portions 92a and 92b to provide one or two feeding strokes before each cutting operation. Further, it has been found that the described apparatus is capable of trouble-free operation at very high speeds which are of the order of three to five times greater than the speeds that can be achieved with previously proposed machines.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention, except as defined in the appended claims.

What is claimed is:
1. An apparatus for cutting lengths of tape from a continuous supply thereof, comprising
   guide means for directing the tape along a straight horizontal path,
   reciprocable feeding means actuated by a first fluid pressure operated cylinder for advancing the tape a predetermined distance along said path upon each operation of said first cylinder,
   a reciprocable cutting assembly actuated by a second fluid pressure operated cylinder to cut across the tape projecting beyond an end of said guide means,
   mounting means supporting said cutting assembly for angular displacement relative to said guide means about a vertical axis intersecting said path so as to vary the angle, relative to the longitudinal edges of the tape, at which the tape is cut,
   a third fluid pressure operated cylinder having a piston reciprocable therein and connected with said mounting means to effect said angular displacement of the cutting assembly, and
   control means including first, second and third valve means through which fluid under pressure is supplied to said first, second and third cylinders, respectively, a rotated cam shaft, and first, second and third cams on said shaft actuating said first, second and third valve means, respectively, to cause at least one reciprocation of said feeding means during each revolution of the cam shaft, to cause a reciprocation of said cutting assembly during a portion of each said revolution following said reciprocation of the feeding means, and to urge said piston to move in opposite directions within said third cylinder during successive revolutions of said cam shaft.

2. An apparatus as in claim 1;
   further comprising separately adjustable stop means limiting angular displacement, in opposite directions, of said cutting assembly by said piston in the third cylinder.

3. An apparatus as in claim 1;
   wherein said third cam is turnable relative to said cam shaft, and
   further comprising gear means driven from said cam shaft and driving said third cam at one-half the rotational speed of said shaft.

4. An apparatus as in claim 1;
   wherein said first cam includes at least two similar portions which are circumferentially adjustable relative to each other to selectively cause a single reciprocation and a plurality of reciprocations, respectively, of said feeding means before said reciprocation of the cutting means during each revolution of the cam shaft.

5. An apparatus for cutting lengths of tape from a continuous supply thereof, comprising
   guide means for directing the tape along a straight horizontal path,
   feeding means including a slide reciprocable parallel to said path and carrying jaws which grip the tape to advance the latter along said path during movement of said slide toward one end of the guide means, and first fluid pressure operated drive means for reciprocating said slide,
   a base mounted adjacent said one end of the guide means and being turnable about a vertical axis intersecting said path, a vertically reciprocable cutting means mounted on said base and being actuated by a second fluid pressure operated drive means to cut across the tape projected beyond said one end of the guide means by said feeding means,
   a third fluid pressure operated drive means to urge said base to turn alternately in opposite directions after each actuation of said cutting means, said third fluid pressure operated drive means including a fixed cylinder extending parallel to, and spaced laterally from said guide means, a piston reciprocable in said cylinder by fluid admitted alternately at opposite ends of the cylinder, a piston rod extending axially in both directions from said piston projecting out of the opposite ends of said cylinder and means connecting one end of said rod with said base, and
   separately adjustable stop means limiting the turning of said base in said opposite directions, said stop means including a fixed member projecting into the path of travel of the other end of said piston rod in the direction away from said cylinder, a stop screw threaded through said fixed member in axial alignment with said piston rod so as to be engageable with said other end of the latter, abutment forming means on said other end of the piston rod, and a stop member adjustable parallel to said piston rod having an apertured portion slidably receiving said piston rod between said abutment forming means and the adjacent end of said cylinder so that engagement of said abutment forming means with said portion of the stop member determines the limit of movement of the piston rod in the direction away from said stop screw.

6. An apparatus for cutting lengths of tape from a continuous supply thereof, comprising
    guide means for directing the tape along a straight horizontal path, feeding means including a slide reciprocable parallel to said path and carrying jaws which grip the tape to advance the latter along said path during movement of said slide toward one end of the guide means, and first fluid pressure operated drive means for reciprocating said slide,
    a base mounted adjacent said one end of the guide means and being turnable about a vertical axis intersecting said path,
    a vertically reciprocable cutting means mounted on said base and being actuated by a second fluid pressure operated drive means to cut across the tape projected beyond said one end of the guide means by said feeding means,
    a third fluid pressure operated drive means to urge said base to turn alternately in opposite directions after each actuation of said cutting means, said third fluid pressure operated drive means including a fixed cylinder extending parallel to, and spaced laterally from said guide means, a piston reciprocable in said cylinder by fluid admitted alternately at opposite ends of the cylinder, a piston rod extending axially in both directions from said piston and projecting out of the opposite ends of said cylinder, a head on one end of said piston rod carrying an upwardly extending roller, and a connecting member at the underside of said base having a downwardly opening groove extending radially with respect to the axis of turning of said base and receiving said roller extending upwardly from said head, and
    separately adjustable stop means engageable with the other end of said piston rod and limiting the turning of said base in said opposite directions.

7. An apparatus according to claim 6,
    further comprising a fixed guide member arranged under said one end of the piston rod and having a slot extending parallel to the latter, and a roller depending from said head and engaging in said slot.

References Cited by the Examiner

UNITED STATES PATENTS

| 1,375,336 | 4/1921 | Wadsworth | 83—639 X |
| 2,039,349 | 5/1936 | Romaine et al. | |
| 2,428,493 | 10/1947 | Haller | 83—277 X |
| 2,767,789 | 10/1956 | Budlong et al. | 83—215 |
| 2,920,521 | 1/1960 | Abbenante | 83—215 |
| 3,122,042 | 2/1964 | Littell et al. | 83—215 |

ANDREW R. JUHASZ, *Primary Examiner.*